R. Grant,
Hanging Saws.
N° 973.  Patented Oct. 8, 1838.
2 Sheets—Sheet 1.
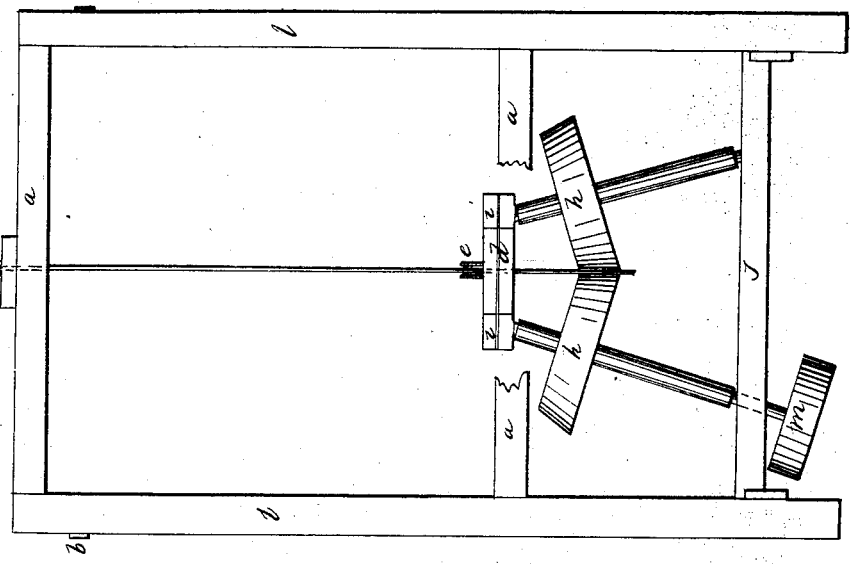
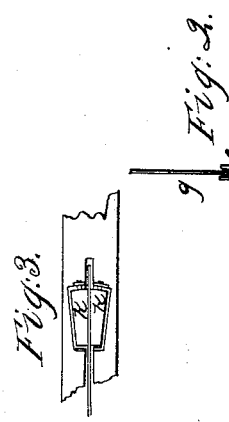
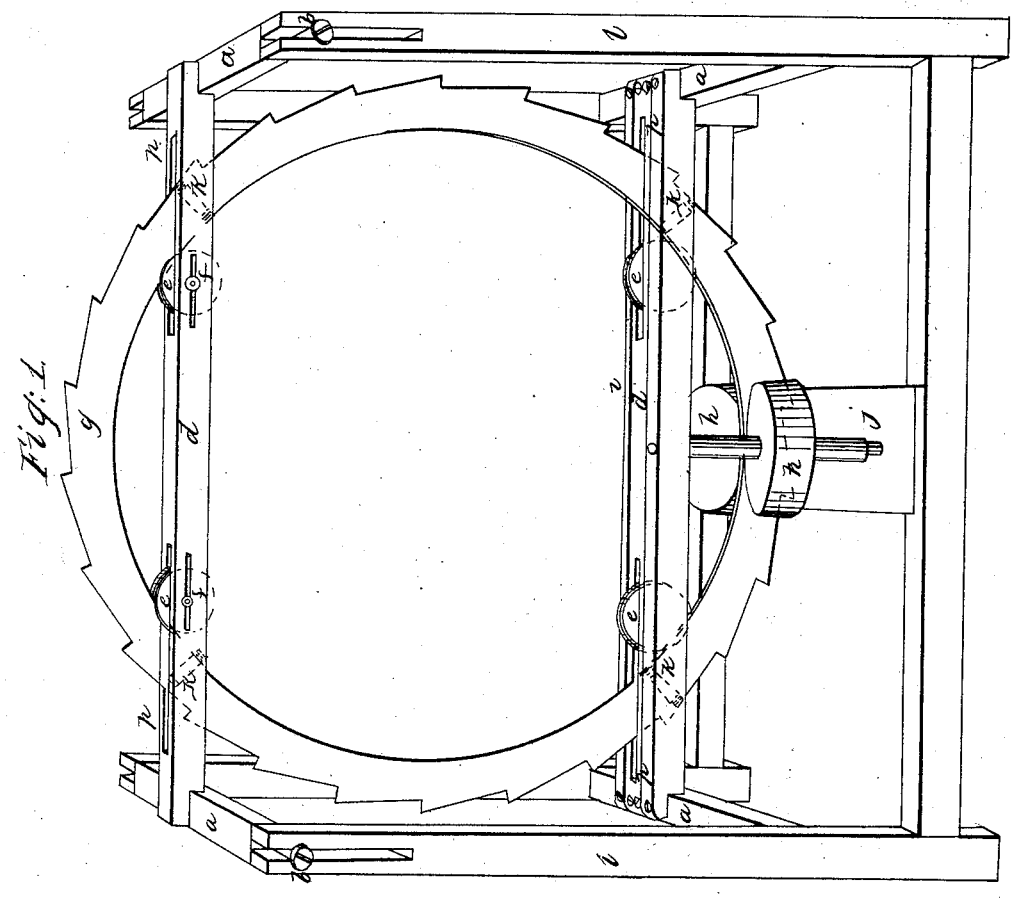

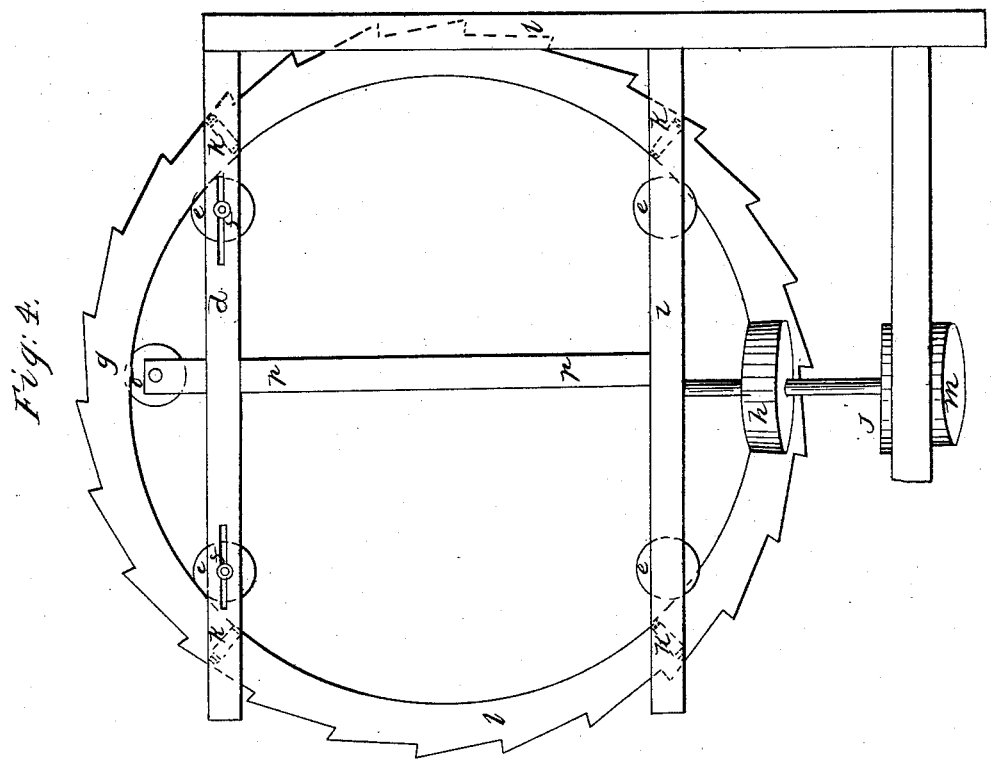

UNITED STATES PATENT OFFICE.

ROBERT GRANT, OF BALTIMORE, MARYLAND.

ANNULAR SAW FOR SAWING TIMBER.

Specification of Letters Patent No. 973, dated October 8, 1838.

*To all whom it may concern:*

Be it known that I, ROBERT GRANT, of the city of Baltimore, State of Maryland, have invented a new and useful Improvement in the Construction and Mode of Operating Circular Saws, which I denominate "Grants Annular Saw;" and I do hereby declare that the following is a full and exact description thereof, reference being had to the drawings accompanying and making part of said description.

The object of this my invention is in making the circular saw to consist of simply a ring of suitable width and to have that ring or rim revolve on friction rollers and by the use of bevel wheels and beveled friction rollers in a manner which will be hereafter described.

Figure 1 is a perspective view. Fig. 2, a geometrical end view. Fig. 3 a section showing the manner of employing the beveled friction rollers. Fig. 4, shows the method of employing the saw for sawing down and cutting up trees.

The frame necessary for the employment of this saw is in many respects similar to the frames of various kinds of machinery consisting of standards, transverse and longitudinal pieces.

$a\ a$ Figs. 1 and 2 are transverse pieces attached at a suitable distance apart to the standards $l$ Figs. 1 and 2 in an adjustable manner as represented at $b$ Fig. 1, they are attached by a screw passing through a slot in the standard into their ends. To these transverse pieces I attach permanently longitudinal pieces $d\ d$ Figs. 1 and 2 which are made adjustable by being so connected. To slots $p\ p$ in each of these pieces I also attach two friction rollers $e$ Figs. 1 and 2 and 4 the distance between which is equal to the space between the two longitudinal pieces, and they revolve in suitable movable boxes F, connected to the longitudinal piece with grooves in their periphery which receive the inner periphery of the annular sawplate. These friction rollers may if necessary be made to possess the qualities of a pinion, and may work into cogs on the inner periphery of the saw, in which case the saw may be propelled by them, and together with the longitudinal and transverse pieces are made adjustable for the purpose of straining the saw.

The saw $g$ Figs. 1, 2 and 4 differs from the common circular saw inasmuch as a suitable proportion of the center of the disk is removed leaving only that portion of the outer circumference which is necessary for strength, &c., and is propelled by two beveled wheels $h$ Figs. 1, 2 and 4 attached to and revolving in additional longitudinal pieces $i$ Figs. 1, 2 and 4 one on each side of the lower longitudinal piece $d$, and a transverse slat $j$ Figs. 1, 2, and 4 attached to the longitudinal pieces on the bottom of the frame. The peripheries of these wheels may be made to press in opposite directions more or less firmly against the sides or disk of the saw by having the longitudinal pieces $i$ made adjustable, and may be smooth or formed with projections which shall work into apertures in the said disk as may be found most beneficial. It should be further remarked that the saw revolves in the slots in the longitudinal pieces.

$k, k$, Figs. 1, 3 and 4 are beveled friction rollers inserted in the longitudinal pieces and working against the sides of the saw to facilitate its revolution.

When this saw is used for sawing boards a suitable carriage is used and the feeding performed in any convenient manner, but when used for sawing down, and cutting up trees transversely, one of the sides of the frame should be taken off (see Fig. 4) in which case the longitudinal pieces $d$ must be supported and kept apart by a brace $n$ Fig. 4 or in any other practicable manner, and its sides or disk may be at right angles with the periphery or beveled as may be desired. The brace may if desired extend past the longitudinal pieces and have a friction roller $o$ Fig. 4 revolve in a slot in its end which shall connect with the saw. The beveled wheels are put in motion and thus communicate motion to the saw by a band passing around a pulley $m$ Fig. 2 and a pulley attached to any motive power.

What I claim as my invention and desire to secure by Letters Patent is—

The annular saw for cutting timber, and the arrangement of the adjustable friction roller and transverse pieces, beveled friction rollers and beveled wheels in combination with and for the purpose of driving the saw as above set forth and described.

ROBERT GRANT.

Witnesses:
JOHN W. HUBBARD,
C. H. WILTBERGER.